C. R. SLIGH.
Saw-Handles.

No. 153,685.

Patented Aug. 4, 1874.

Witnesses.

Inventor:
Chas. R. Sligh.

UNITED STATES PATENT OFFICE.

CHARLES R. SLIGH, OF GRAND RAPIDS, MICHIGAN.

IMPROVEMENT IN SAW-HANDLES.

Specification forming part of Letters Patent No. 153,685, dated August 4, 1874; application filed January 12, 1874.

*To all whom it may concern:*

Be it known that I, CHARLES R. SLIGH, of the city of Grand Rapids, county of Kent and State of Michigan, have invented a new and useful Improvement in Saw-Handles for Cross-Cut-Saws, of which the following is a specification, reference being had to the accompanying drawings making part of this specification.

My invention consists in the combination of two cylinders, provided each with a circular nut, and with a slotted rod provided with screw-threads, together forming a saw-handle.

Figure 1:
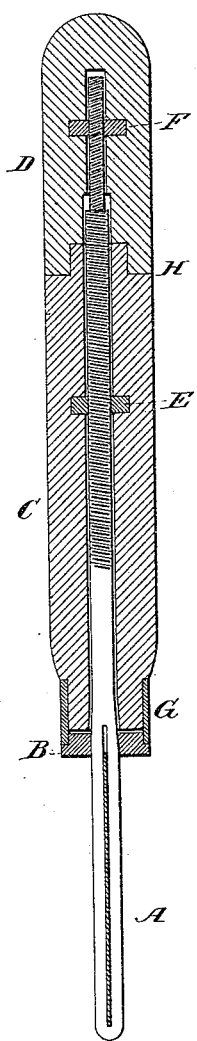
Figure 2:
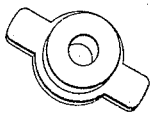
Figure 3:
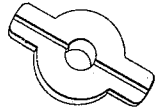

In the drawings, Figure 1 represents a vertical sectional view of my invention, showing all the parts. Fig. 2 is a sectional view of the clamp; Fig. 3, a view of the clamp, showing the groove of the clamp which receives the back of the saw.

In Fig. 1, D represents the upper portion of the handle, and C the lower portion. The parts C and D are bored axially, as shown, and receive the slotted rod A, as shown. F is a round nut, inserted into the part D, and is provided with a screw-thread, so as to receive the screw-rod A, and E is a similar nut, inserted in the same manner and for a similar purpose in the part C. The two parts D and C join together by a tenon and mortise, as shown in Fig. 1, at H. G is a ferrule, fitted to the lower end of C, as shown, and projects a short distance below the end of part C. B is a clamp, provided with a groove which fits upon the saw; the form of the groove and shape of the clamp are shown in Fig. 3. This clamp B is provided with a shoulder, as shown in Fig. 2, which shoulder fits into the ferrule G, and is thereby more firmly held in place. The screw-thread on the rod may be the same continuously, or it may be different on that portion of the rod working through nut E from the thread working through F, or the thread may be cut so that one nut, F, screws in one direction, and the nut E in another. The latter method will hold the handle more firmly to the saw than the other, but I deem either method sufficient, the principal object being to construct a saw-handle in two parts, each part being held by a nut, as described.

Having thus described my invention, I claim—

The combination of the slotted rod A with the parts C D of the handle, provided with recesses for the reception of the nuts E and F on rod A, all constructed and operating as described.

CHAS. R. SLIGH.

Witnesses:
  ALFRED PUTNAM,
  E. T. MILLER.